United States Patent [19]

Tuerk

[11] 4,067,601
[45] Jan. 10, 1978

[54] TRUCK STAKE ARRANGEMENT

[76] Inventor: Robert P. Tuerk, 7710 Candlewood Lane, Indianapolis, Ind. 46250

[21] Appl. No.: 617,700

[22] Filed: Sept. 29, 1975

Related U.S. Application Data

[63] Continuation-in-part of Ser. No. 419,121, Nov. 26, 1973, abandoned.

[51] Int. Cl.² .......................................... B62D 27/00
[52] U.S. Cl. .................................... 296/36; 52/704; 105/380; 296/43
[58] Field of Search ............... 296/36, 43; 280/143, 280/144, 148; 248/24, 25; 52/241, 243, 298, 704; 105/380, 383, 390, 389

[56] References Cited

U.S. PATENT DOCUMENTS

| 3,191,864 | 6/1965 | Moses | 52/704 |
| 3,692,354 | 9/1972 | Tuerk | 296/36 |
| 3,811,724 | 5/1974 | Woodward | 296/36 |
| 3,940,179 | 2/1976 | McBride | 296/36 |

Primary Examiner—Robert R. Song
Assistant Examiner—John A. Carroll
Attorney, Agent, or Firm—Woodard, Weikart, Emhardt & Naughton

[57] ABSTRACT

An arrangement of stakes for supporting panels on a flat bed truck. Hollow stakes with bottom ends strengthened and enlarged by tapered jackets are mounted in pockets on the periphery of the bed. The stakes have triangular shaped cross sections with the corners being thickened. Some of the stakes have integral walls projecting therefrom which define grooves which receive and support the vertically extending ends of side panels for the truck bed. Tarpaulin rods are secured to the hollow top ends of the stakes which contain a longitudinal guide member for receiving said rods. One embodiment of the stake of the invention has basically a delta T configuration while another has a winged delta configuration.

12 Claims, 20 Drawing Figures

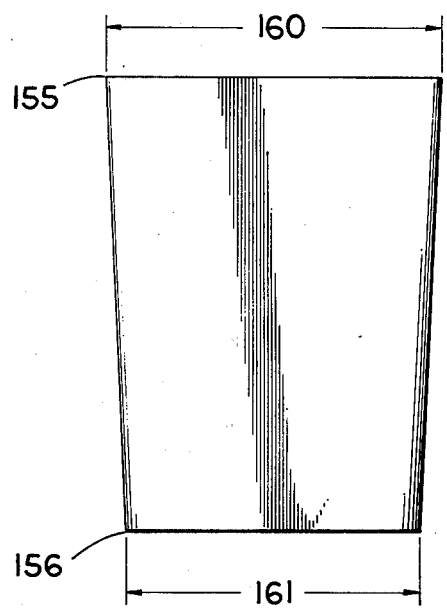
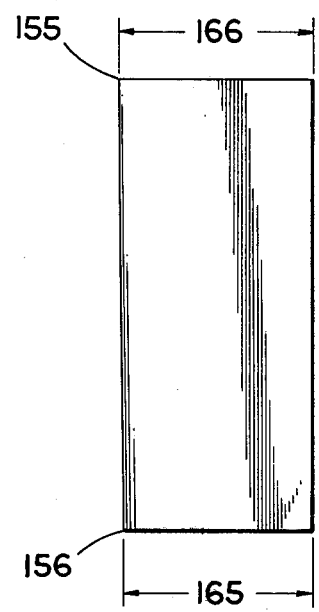
Fig.14    Fig.14A
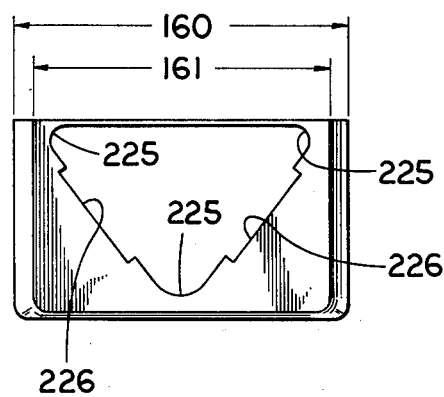
Fig.15
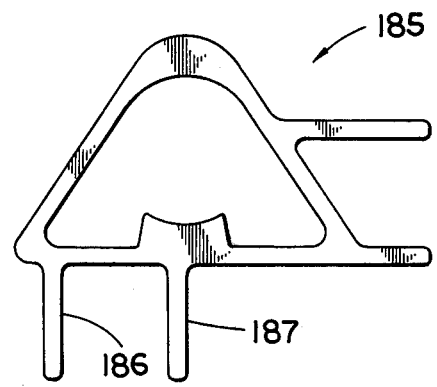
Fig.17
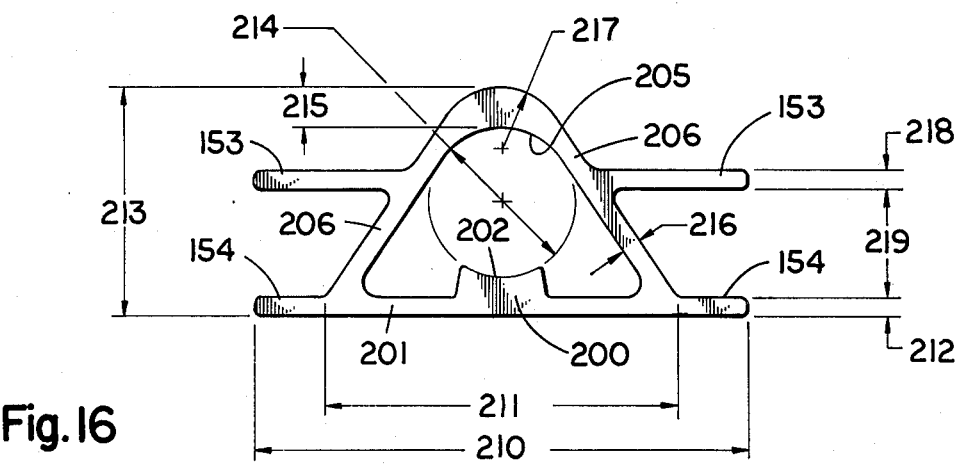
Fig.16

TRUCK STAKE ARRANGEMENT

CROSS REFERENCE TO RELATED APPLICATION

This is a continuation-in-part of my patent application Ser. No. 419,121, filed Nov. 26, 1973 and since abandoned.

BACKGROUND OF THE INVENTION

1. Field of the Invention

This invention relates to improved truck stake and flat bed structures.

2. Description of the Prior Art

Many trailer structures have been devised for highway use in order to transport cargo. Some of these trailer structures are flat beds with vertical side walls for containing the cargo. To improve the versatility of the trailer structure it is desirable to convert a trailer without side walls to a trailer with side walls and vice versa. Thus, several trailer structures have been devised having removable vertical stakes and associated panels. Five of these structures are disclosed in the following five U.S. Pat. Nos. 3,126,224 issued to Carter et al; 2,222,335 issued to Dietrich; 1,363,059 issued to Shanahan; 3,174,592 issued to Berman et al; and 3,692,354 issued to Tuerk, of which this invention is an improvement. Other relevent prior art is shown in the U.S. Pat. Nos. to Swanson 3,661,420 and Dill 571,514.

A major problem with several of the prior art convertible trailer structures is that a large amount of time is required to convert the structure from a flat bed trailer to a trailer having side and end walls. The vertically extending stakes are configured to fit and seat within a specific pocket channel secured to the periphery of the bed. These pocket brackets are of standard configuration; however, the internal dimensions of the pocket vary up to a maximum of one-half inch. Thus, the stakes are not interchangeable since they have a size configured to fit within their respective pockets. The present invention solves this problem by providing stakes having jacketed triangular shaped ends which fit within all the pocket brackets. For example, a single size stake might be used with jackets of three external sizes to handle all of the different sizes of stake pocket. The jacketed stakes of this invention not only provide greater interchangeability but also supply additional structural strength at the point of greatest stress.

SUMMARY OF THE INVENTION

One embodiment of this invention might involve a truck flat bed arrangement having pocket brackets located around the periphery of the bed and providing a plurality of internally rectangular pockets, a plurality of hollow stakes, and panels removably mounted on said bed and having vertically extending ends supported by the stakes. The improvement comprises jackets each receiving a respective one of the stakes, the stakes and jackets being removably seated in the pockets. Another embodiment of the invention involves a stake-jacket combination wherein walls are located on the sides of a triangular stake for holding panels, said walls being trimmed off at the portion of the stake that is received in the jacket. Still another embodiment of the invention involves a truck stake including a raised tarpaulin rod guide saddle located on the inside of the hollow stake and having a part-circular surface adapted to support a tarpaulin rod in cooperation with another part-circular surface on the inside of said stake. Still a further embodiment of the invention involves a jacket for use with a truck stake wherein the jacket has a triangular internal configuration with the corners spaced inwardly of the sides and adapted to grip the corners of a triangular stake.

One object of the present invention is to provide an improved trailer stake arrangement.

A further object of the present invention is to provide an improved truck stake having an open upper end for receiving tarpaulin rods and a jacketed bottom end adapted to seat in a pocket bracket.

Still another object of the present invention is to provide jacketed trailer bed stakes which will seat in any standard trailer bed pocket bracket arrangement.

A further object of the present invention is to provide stakes which will support trailer bed panels and which provide more load space with less wood in the panels.

Related objects and advantages of the present invention will be apparent from the following description.

BRIEF DESCRIPTION OF THE DRAWINGS

FIG. 14 is a front elevation of the stake jacket of FIGS. 11-13.

FIG. 14A is a side elevation of the jacket of FIG. 14.

FIG. 15 is a bottom view of the stake jacket of FIG. 14.

FIG. 16 is a top plan of the stake of FIGS. 11-13.

FIG. 17 is a top plan view of a corner stake used in the truck stake arrangement of FIGS. 18 and 19.

DESCRIPTION OF THE PREFERRED EMBODIMENT

Figure 1:
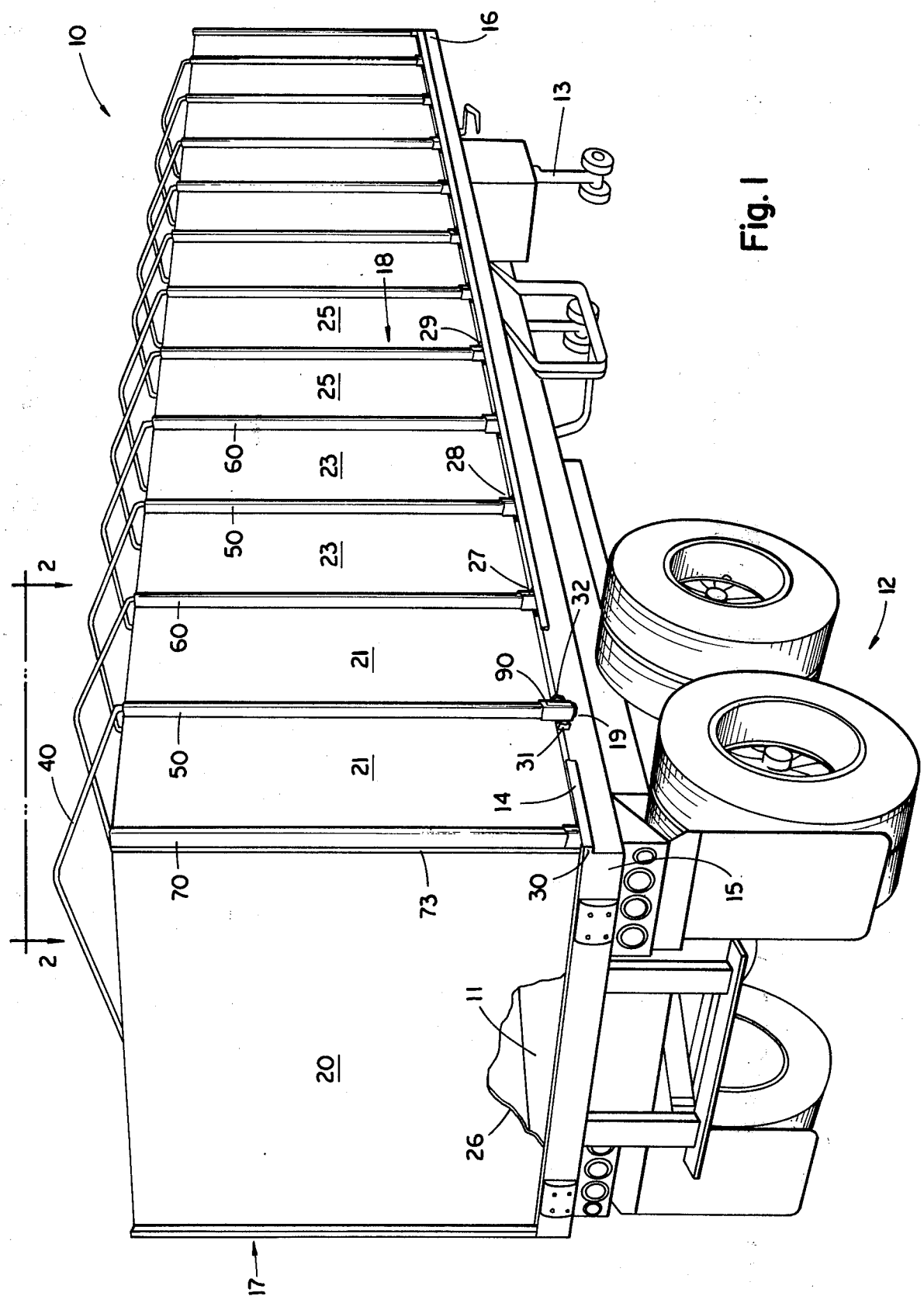
FIG. 1 of the drawing is a fragmentary perspective view of a flat bed trailer incorporating the present invention.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring now to FIG. 1, there is illustrated a flat bed trailer 10 having a horizontal bed 11 for positioning cargo thereon. Wheels 12 are rotatably mounted on the bottom of trailer 10 and conventionally extendable supports 13 are mounted on the front portion of the trailer. A bar 14 is fixedly attached to the side 18 of the trailer and extends from the end 15 to end 16. Bar 14 is spaced away from bed 11 with pocket brackets 19, 27, 28, 29 and 30 positioned approximately every 2 feet the length of the bed. Pocket brackets 19, 27, 28, 29 and 30 are identical. These brackets, as well as bar 14, are quite conventional and may be found on most flat bed trailers. The brackets are C-shaped, having their ends attached to the bed with their middle portion attached to bar 14 so as to define rectangular shaped pockets for receiving the upwardly extending stakes 50, 60 and 70. A bar identical to bar 14 is positioned on side 17 of the trailer and is also spaced away from the edge of the bed having pocket brackets positioned therebetween and each being aligned across from the pocket brackets on the opposite sides of the bed.

Panels are positioned between stakes 60 and 70 to retain the cargo. The stakes are hollow and receive tarpaulin bows 40 upon which a tarpaulin is secured. Bows 40 are rods of cylindrical cross section having ends inserted into the stakes along each side of the trailer. Bows 40 are received by curved guide element or saddle 81 on the inside wall of the hollow stakes. The guide saddle 81 has a part-circular surface adapted to support the tarpaulin rod or bow. The part-circular saddle 81 is coaxial with the inside surface of the junctions of two of the sides 56 which surface is also part-circular.

Figure 4:
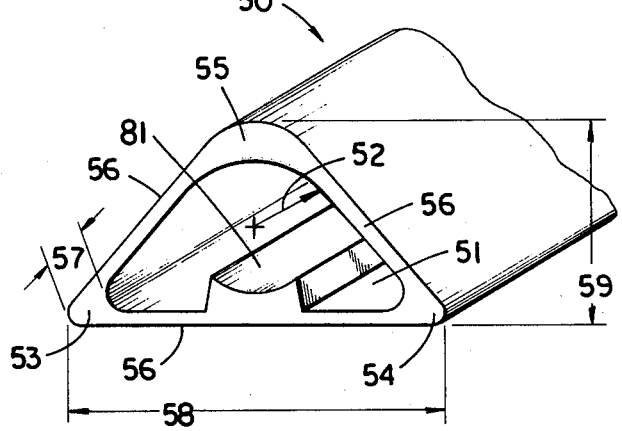
FIG. 4 is a fragmentary perspective view of a delta stake shown in FIG. 1.

A perspective view of delta stake 50 is shown in FIG. 4. Stake 50 has a triangular configuration enclosing and defining opening 51 which receives the tarpaulin bow 40 on curved surface 81 as previously described. In the event that the ends of bows 40 fit too loosely in the stakes, hollow cylinders, not shown, may be press fitted or secured by other means in the top hollow ends of stakes 50, 60 and 70 to receive the ends of the tarpaulin bows 40. Stake 50 (as well as all of the stakes 50, 60 and 70 are of constant cross section and) may be made by extruding aluminum so that the wall thickness is approximately one-eighth inch. Corners 53, 54 and 55 are substantially thicker than walls 56. In one specific embodiment, the thickest portion of each corner is at least 0.300 inch as denoted by dimension 57.

The bottom portion of stake 50 that is received by pocket brackets 19, 27, 28, 29 and 30 as viewed in FIG. 4 is strengthened and enlarged by jacket 90 as shown in FIGS. 7, 8, 9 and 10. The inside walls of jacket 90 conform in shape to sides 56 and corners 53, 54 and 55 of stake 50. Jacket 90 can be mounted on stake 50 by means of press-fitted pin 91 which prevents movement in any direction of jacket 90 once in place. When jacket 90 is properly mounted on stake 50 the combined bottom width of jacket 90 and stake 50 (in one specific embodiment of the invention) is approximately 3.250 inches as shown by dimension 95. The overall depth of the stake and jacket, denoted by dimension 96, is approximately 1.750 inches. As previously discussed, the dimension of the pockets enclosed by brackets 19, 27, 28, 29 and 30 (FIG. 1) vary greatly. For example, a pocket formed by a bracket may have a length of 3 to 3½ inches and a width of 1½ to 1⅝ inches. The thick corners 92, 93 and 94 of jacket 90 allow trimming or tapering of the corners so that the stake and jacket will readily fit into a pocket bracket. Corners 92, 93 and 94 may be filed down with a standard file or may be cut down with a saw or other means. It has been found that it is best to file or remove a portion of the corners in such a way that the body of the stake and jacket tapers toward its end. Thus, stake may be inserted into any pocket bracket and will still be securely held therein. In fact, stakes incorporating the present invention from different trailers may be readily interchanged. If the pocket brackets are of differing sizes, the jackets may be replaced without the necessity of a whole new stake. Bracket 19 is fragmented at 31 to illustrate the tapered bottom end 32 of jacket 90. The removable jackets may be extruded from the same aluminum material from which stakes 50, 60 and 70 are extruded or may be made from a rubber material, preferably a hard rubber.

Figure 9:
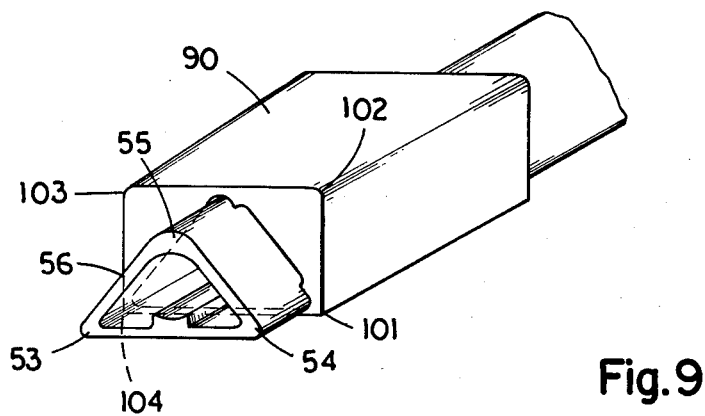
FIG. 9 is a fragmentary perspective view of a bottom jacketed stake including a hard rubber jacket.
Figure 10:
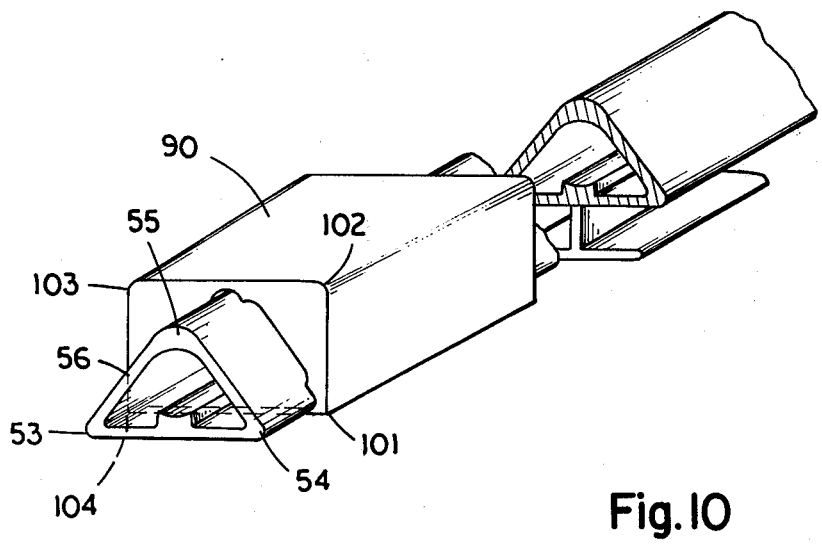
FIG. 10 is a fragmentary perspective view of the bottom jacketed end of a delta T-stake shown in FIG. 1 including a hard rubber jacket.
Figure 11:
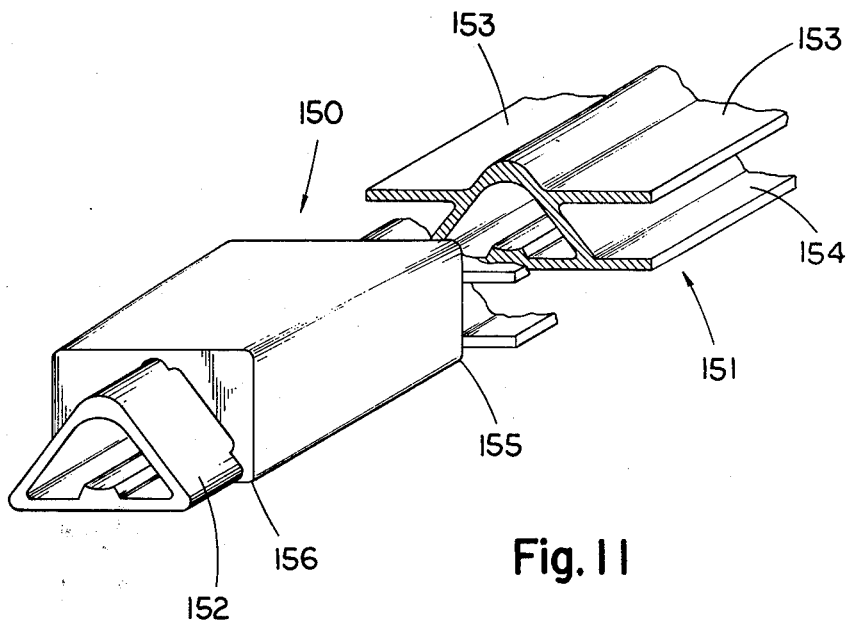
FIG. 11 is a fragmentary perspective view of a preferred alternative form of the jacketed stake of the invention.

An alternative embodiment of jacket 90 is illustrated in FIGS. 9 and 10. Jacket 90 is made from a hard rubber material. Rubber jacket 90 is made in tapered configuration thus avoiding the necessity of cutting or filing as with the extruded aluminum jacket. Additionally, as can be seen in FIG. 9, the hard rubber jacket 90 is rectangular in cross section rather than triangular. Although the stake 50 still contacts jacket 90 at inside jacket corners 53, 54 and 55, the jacket outside has four distinct corners 101, 102, 103 and 104. This provides for a more secure fit into rectangular pocket brackets 19, 27, 28, 29 and 30.

Figure 5:
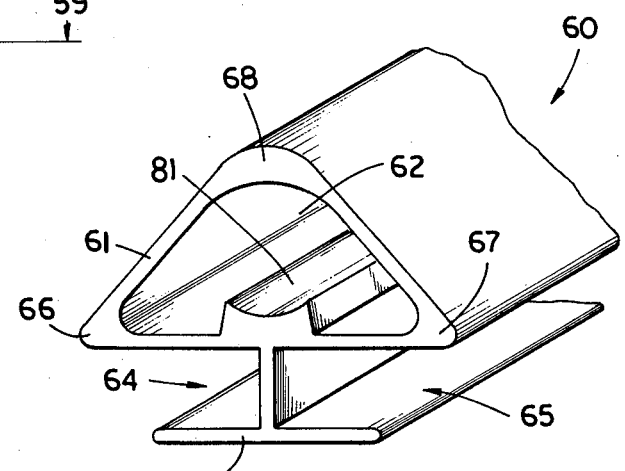
FIG. 5 is a fragmentary perspective view of a delta T-stake shown in FIG. 1.

Delta T-stake 60 is shown in FIG. 5 having a delta shaped body 61 identical to delta stake 50. A T-shaped bracket 63 is integrally attached to body 61 defining side-panel-receiving channels 64 and 65. The corners 66, 67 and 68 are identical to the corners of delta stake 50. An opening 62 is formed within body 61 for receiving tarpaulin bows 40 and contains longitudinal guide members 81. Stakes 60 are jacketed in a manner similar to stakes 50 except that the T-shaped bracket is removed from the delta prior to jacketing.

Figure 6:
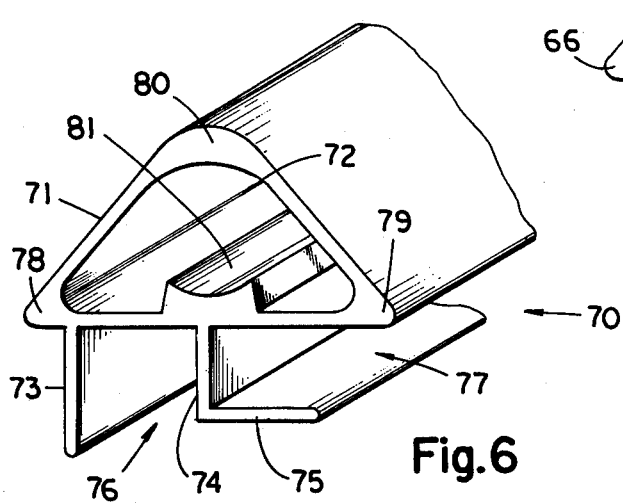
FIG. 6 is a fragmentary perspective view of a corner delta stake shown in FIG. 1.
Figure 7:
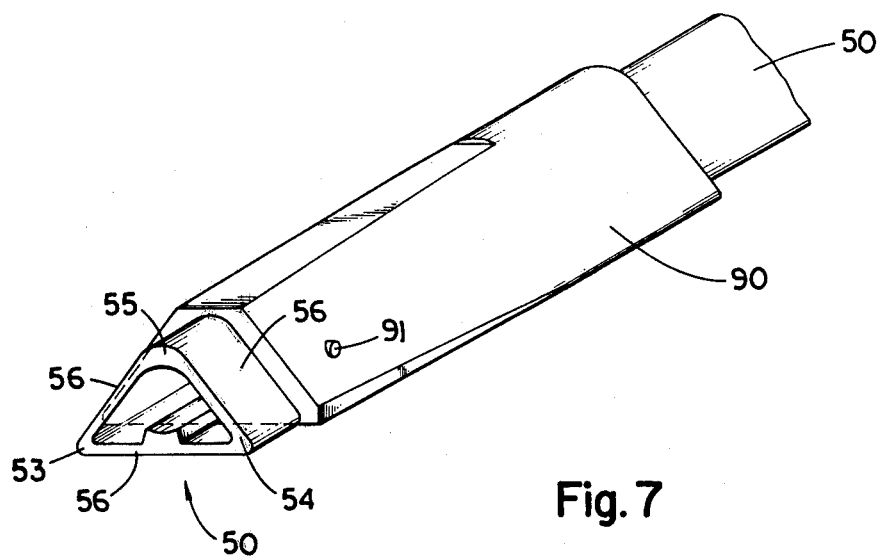
FIG. 7 is a fragmentary perspective view of the bottom jacketed end of a delta stake shown in FIG. 1.
Figure 8:
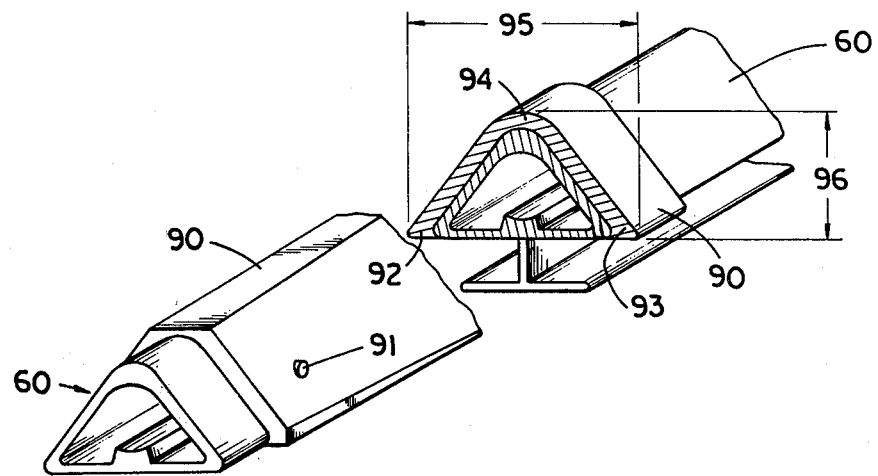
FIG. 8 is a fragmentary perspective view of the bottom jacketed end of a delta T-stake shown in FIG. 1.

FIG. 6 is a perspective view of a corner delta stake 70 which has a delta shaped body 71 identical to body 61 of stake 60 (FIG. 5). Body 71 has thickened corners 78, 79 and 80 identical to the corners of stakes 50 and 60. Opening 72 is formed within body 71 for receiving tarpaulin bows 40 and containing longitudinal guide member 81. Walls 73 and 74 are integrally attached to body 71. Wall 74 is spaced from and parallel with wall 73 forming channel 76 for receiving back panel 20. A third wall 75 is integrally joined at right angles to wall 74 forming side channel 77 for receiving side panel 21.

Figure 2:
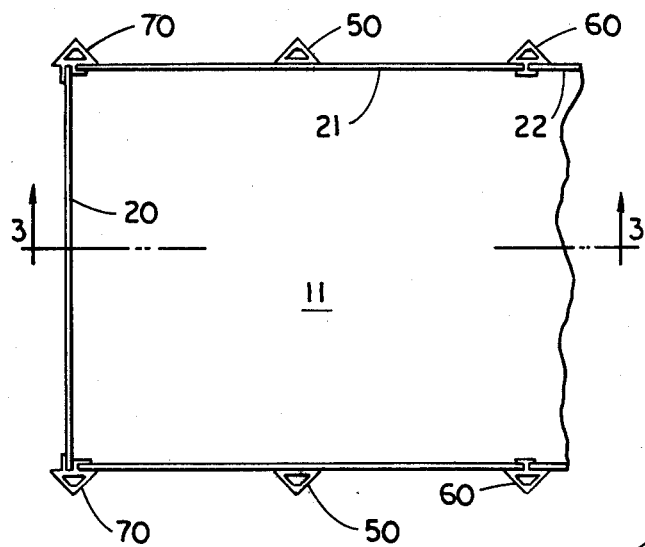
FIG. 2 is a fragmentary top view looking in the direction of arrows 2—2 of the trailer shown in FIG. 1 with bows 40 removed.
Figure 3:
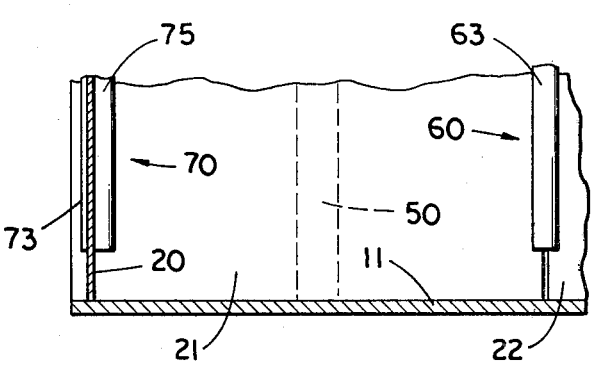
FIG. 3 is a fragmentary sectional view taken along the line 3—3 of FIG. 2 and viewed in the direction of the arrows.

FIG. 3 is a fragmentary view of panels 20, 21 and 22 viewed in the direction of arrows 3-3 of FIG. 2. Back panel 20 and side panel 21 rest atop bed 11 and are secured together by corner delta stake 70. Walls 73, 74 and 75 (FIG. 6) extend from the top of stake 70 to a position immediately above bed 11. Panels 21 and 22 are parallel, resting atop bed 11 and are held in place by channels 64 and 65 (FIG. 5) of delta T-stake 60. T-bracket 63 extends from the top of stake 60 to a position immediately above bed 11. Jacketed stake 50 is positioned on the exterior side of panel 21 and provides support therefor. Panels 23 and 25 (FIG. 1) are secured atop of bed 11 and are held in place by jacketed delta T-stake 60. Jacketed delta stake 50 received in pocket 28 supports panel 23.

The described arrangement of panels and stakes are used completely around the periphery of the trailer bed. That is, adjacent panels are secured together by jacketed delta T-stakes 60 with a jacketed delta stake 50 being used between stakes 60 to support a center section of a panel. Of course, jacketed corner delta stakes 70 are used on each one of the four corners of the trailer to support the end panels with the side panels. This arrangement is very satisfactory to contain grain or other products which rest against the side of the panels. Typically, the distance between pockets is approximately two feet, thus allowing maximum panel support. In some cases, products such as steel girders are contained within trailer 10 and do not apply a large amount of force against the interior sides of the panels. In the latter case, jacketed stakes 50 may be removed since the center section of each panel does not require a support. The panels are typically made from ⅝ inch plywood and are 4 feet in length. The height of the panels may vary; however, standard panel heights are 4, 5, 6 and 7 feet. The end panels have identical heights to the side panels having lengths approximately the width of the trailer bed.

Referring now more particularly to FIGS. 11–19, there is illustrated a further preferred embodiment of the invention which includes a hard rubber jacket 150 used with a winged delta stake 151. The bottom portion 152 of the stake 151 has the wings 153 and 154 trimmed off to receive thereon the jacket 150. The jacket 150 tapers from its upper end 155 to its lower end 156 in its width dimension. That is, the dimension 160 in FIG. 14 is greater than the dimension 161. Also, there is a slight amount of taper in the depth or thickness of the jacket so that the lower end 156 has a lesser dimension 165 than the dimension 166 at the upper end 155. Because the cross section of the jacket changes along the length of the jacket, it is cast rather than extruded. Even though only one size of stake need be provided, preferably three sizes of jacket are provided so that the single stake size is usable in pockets of different sizes.

Figure 12:
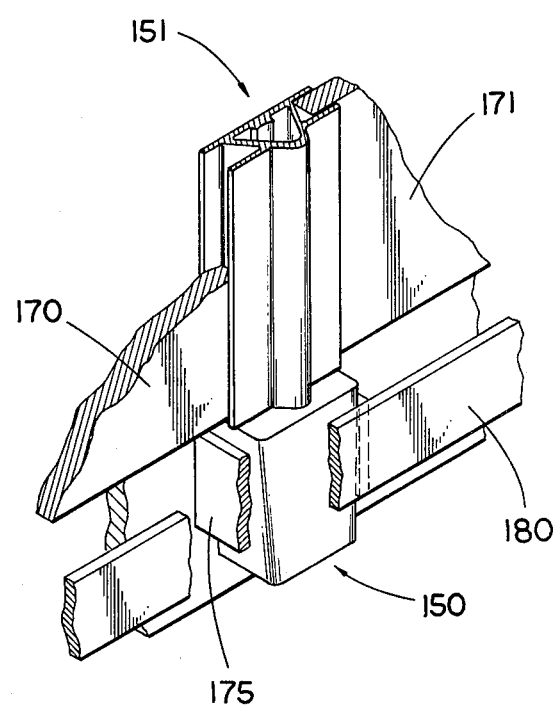
FIG. 12 is a fragmentary perspective view of a truck bed and panels showing them with the stake of FIG. 11.
Figure 13:
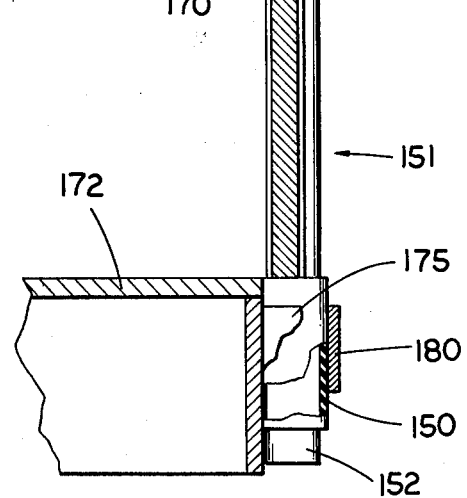
FIG. 13 is a vertical section taken along the line 13—13 of FIG. 18 showing the stake of FIG. 11 and associated structure.

The winged-stake-151-jacket-150 combination makes possible the carrying of a larger load on the trailer than does the delta T-stake 60. The reason for this is illustrated in FIGS. 12 and 13 where it can be seen that the panels 170 and 171 are supported on the jacket 150 and on the bracket 175 and are positioned outboard of the horizontal bed 172 of the trailer. (The bracket 175 and the bar 180 are identical to the conventional bracket 31 and bar 14.) In the case of the panels 21, 23 and 25 the delta T-stake 60 locates them inboard over the horizontal bed 11.

The winged stake 151 requires less wood for panels than does the delta T-stake. Less wood is required because the width of the winged stake replaces some of the panelling.

Figure 18:
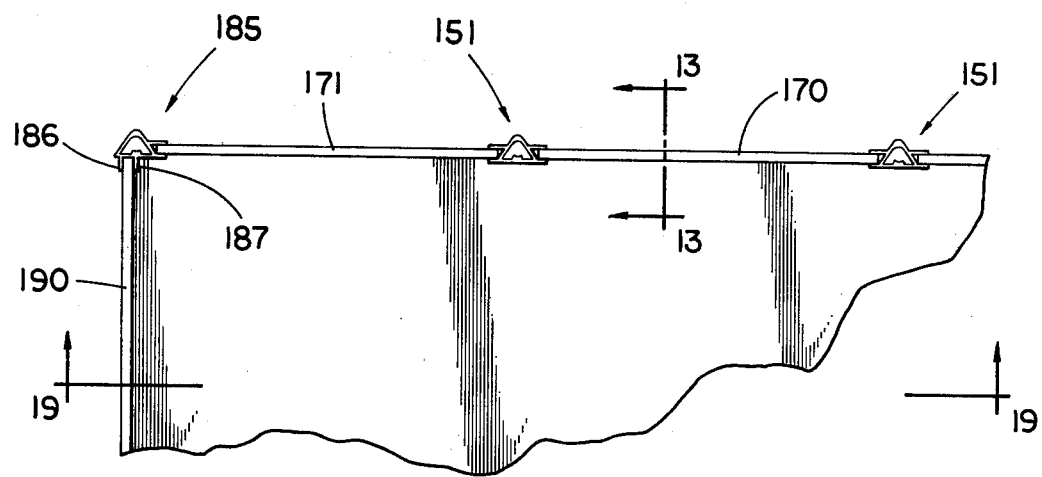
FIG. 18 is a fragmentary top plan view similar to FIG. 2 of a truck stake arrangement including the structure of FIGS. 11-17.
Figure 19:
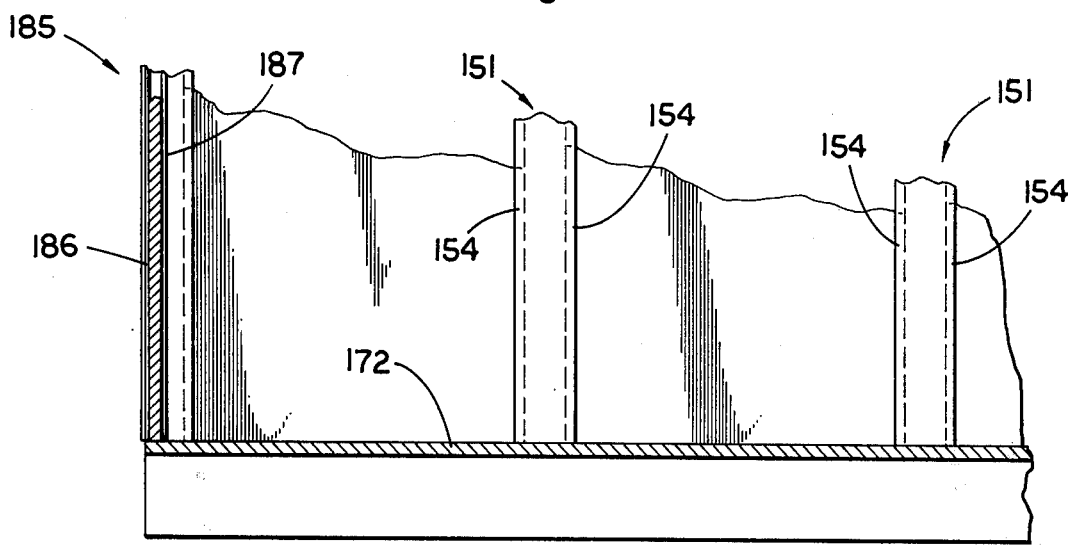
FIG. 19 is a vertical section taken along the line 19—19 of FIG. 18.

In FIG. 17 there is illustrated the cross sectional configuration of a stake 185 which corresponds to the stake 70 of FIG. 6. Stake 185 is identical to stake 151 except that two of the walls or wings 153 and 154 are removed and walls 186 and 187 placed on the bottom of the cross section to support the rear panel 190 on the trailer. FIG. 18 which corresponds to FIG. 2 illustrates this relationship. Note that the arrangement of FIG. 18 does not include a stake having no wings like stake 50. Also the panels 170 and 171 are slightly less than one-half as long as the panels 21. FIG. 19 corresponds to FIG. 3 and illustrates that the wings 153, 154, 186 and 187 extend substantially to the bed 172 of the trailer.

FIG. 16 shows the cross section of the winged delta stake 151. The stake 151 has a raised tarpaulin rod guide saddle 200 located on the inside of the side 201 of the triangular cross section. The saddle 200 has a part-circular surface 202 which is coaxial with the inside surface 205 of the junction of the equal sides 206 of the triangular cross section. The cross section defined by the surface 205 is also part circular and adapted to support the tarpaulin rod along with the surface 202. In one embodiment of the invention the following dimensions were true:

210 — 3.250 inches
211 — 2.250 inches
212 — 0.125 inches
213 — 1.500 inches
214 — 0.950 inches dia.
215 — 0.275 inches
216 — 0.125 inches
217 — 0.406 R inches
218 — 0.125 inches
219 — 0.700 inches It should be noted that the walls 154 are aligned with and extensions of the side 201.

The specific configuration of the jacket is shown in FIGS. 14, 14A and 15. The rubber or rubber-like material of the jacket 150 is preferably cast in the illustrated configuration and has a generally triangular internal configuration with the corners 225 thereof spaced inwardly of the sides 226. Such a configuration insures a good grip of the jacket on the stake yet permits the jacket to be removed from the stake. In the described specific embodiment of the invention, the dimension 160 was 3 inches and the other dimensions were proportional as illustrated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. In a truck flat-bed arrangement having pocket brackets located around the periphery of the bed and providing a plurality of internally rectangular pockets, a plurality of hollow stakes, and a plurality of panels removably mounted on said bed and having vertically extending ends supported by said stakes, the improvement which comprises a plurality of jackets each being tapered in both depth and width from one end thereof to the other and each receiving a respective one of said stakes, said jackets with stakes therein being removably seated in said pockets.

2. The arrangement of claim 1 wherein at least some of said stakes have projecting walls which are integral therewith, said walls being parallel and spaced apart and forming two grooves each of which receives a respective one of the vertically extending ends of said panels, said walls being trimmed off at the portion of said some stakes which are received in said jackets.

3. In a truck flat-bed arrangement having pocket brackets located around the periphery of the bed and providing a plurality of internally rectangular pockets, a plurality of hollow stakes, and a plurality of panels removably mounted on said bed and having vertically extending ends supported by said stakes, the improvement which comprises a plurality of jackets each being tapered toward one end and each receiving a respective one of said stakes, said jackets with stakes therein being removably seated in said pockets, said stakes including a portion which is triangular in cross section both internally and externally and which has thickened corners.

4. The arrangement of claim 3 wherein at least some of said stakes have projecting walls which are integral therewith, said walls being parallel and spaced apart and forming two grooves each of which receives a respective one of the vertically extending ends of said panels, said walls being trimmed off at the portion of said some stakes which are received in said jackets.

5. In a truck flat-bed arrangement having pocket brackets located around the periphery of the bed and providing a plurality of internally rectangular pockets, a plurality of hollow stakes, and panels removably mounted on said bed and having vertically extending ends supported by said stakes, the improvement which comprises jackets each receiving a respective one of said stakes, said stakes with jackets thereon being removably seated in said pockets, said stakes including a portion which is triangular in cross section both internally and externally and which has thickened corners, at least some of said stakes having walls projecting therefrom and integral therewith, said walls being parallel and spaced apart and forming grooves each of which receives a respective one of the vertically extending ends of said panels, said walls being trimmed off at the portion of said some stakes which are received in said jackets, said triangular cross section including a pair of equal sides and a third side, said cross section further including a raised tarpaulin rod guide saddle located on the inside of said third side, said saddle having a part-circular surface adapted to support a tarpaulin rod, said part-circular surface being coaxial with the inside surface of the junction of said pair of equal sides, said junction also being part-circular and adapted to support a tarpaulin rod, there being four of said walls, and two extend from one of said equal sides and the other two extend from the other of said equal sides, two of said walls being aligned with and extensions of said third side.

6. The arrangement of claim 5 wherein said jackets are constructed of resilient rubber-like material and have a generally rectangular external configuration, said panels being supported on said jackets.

7. The arrangement of claim 6 wherein said jacket is tapered, being larger in depth and width at a portion thereof adjacent to said walls than at a portion thereof removed from said walls, said jacket having a generally triangular internal configuration with the corners thereof spaced inwardly of the sides thereof and gripping the corners of said externally triangular portion of said stake.

8. A truck stake and jacket combination comprising:
a length of rigid elongated material of generally constant triangular cross section, projecting walls from said length which are integral therewith, said walls being parallel and spaced apart and forming two grooves each of which is adapted to receive the end of a panel, and a jacket which is removably mounted on one end of said length and which is tapered toward one end, said walls being trimmed off at the portion of said length which is received in said jacket.

9. A truck stake and jacket combination comprising:
a length of rigid elongated material of generally constant cross section, walls projecting from said length and integral therewith, said walls being parallel and spaced apart and forming grooves each of which is adapted to receive the end of a panel, and a jacket on one end of said stake, said walls being trimmed off at the portion of said stake which is received in said jacket, said stake including a portion which is triangular in cross section both internally and externally and which has thickened corners, said triangular cross section including a pair of equal sides and a third side, said cross section further including a raised tarpaulin rod guide saddle located on the inside of said third side, said saddle having a part-circular surface adapted to support a tarpaulin rod, said part-circular surface being coaxial with the inside surface of the junction of said pair of equal sides, said junction also being part-circular and adapted to support a tarpaulin rod, there being four of said walls and two extend from one of said equal sides and the other two extend from the other of said equal sides, two of said walls being aligned with and extensions of said third side.

10. The combination of claim 9 wherein said jacket is constructed of resilient rubber-like material and has a generally rectangular external configuration, said jacket being tapered and larger in depth and width at a portion thereof adjacent to said walls than at a portion thereof removed from said walls, said jacket having a generally triangular internal configuration with the corners thereof spaced inwardly of the sides thereof and gripping the corners of said externally triangular portion of said stake.

11. A truck stake for use in a truck flat bed comprising:
a hollow length of rigid elongated material of generally constant cross section, said length having a triangular cross section both internally and externally with thickened corners, said triangular cross section including a pair of equal sides and a third side, said cross section further including a raised tarpaulin rod guide saddle located on the inside of said third side, said saddle having a part-circular surface adapted to support a tarpaulin rod, said part-circular surface being coaxial with the inside surface of the junction of said pair of equal sides, said junction also being part-circular and adapted to support a tarpaulin rod;

projecting walls which are integral therewith, said walls being parallel and spaced apart and forming a pair of grooves each of which is adapted to receive the end of a panel, there being four of said walls and two extend from one of said equal sides and the other two extend from the other of said equal sides, two of said walls being aligned with and extensions of said third side.

12. A jacket for use with a truck stake comprising a member of resilient rubber-like material having a generally rectangular external configuration, said member being externally tapered in both depth and width from one end thereof to the other, said member having a generally triangular internal configuration with the corners thereof spaced inwardly of the sides thereof and adapted to grip the corners of an externally triangular stake.

* * * * *